INVENTOR
ALBERT J. GRANBERG
BY
Charles O. Bruce
ATTORNEY

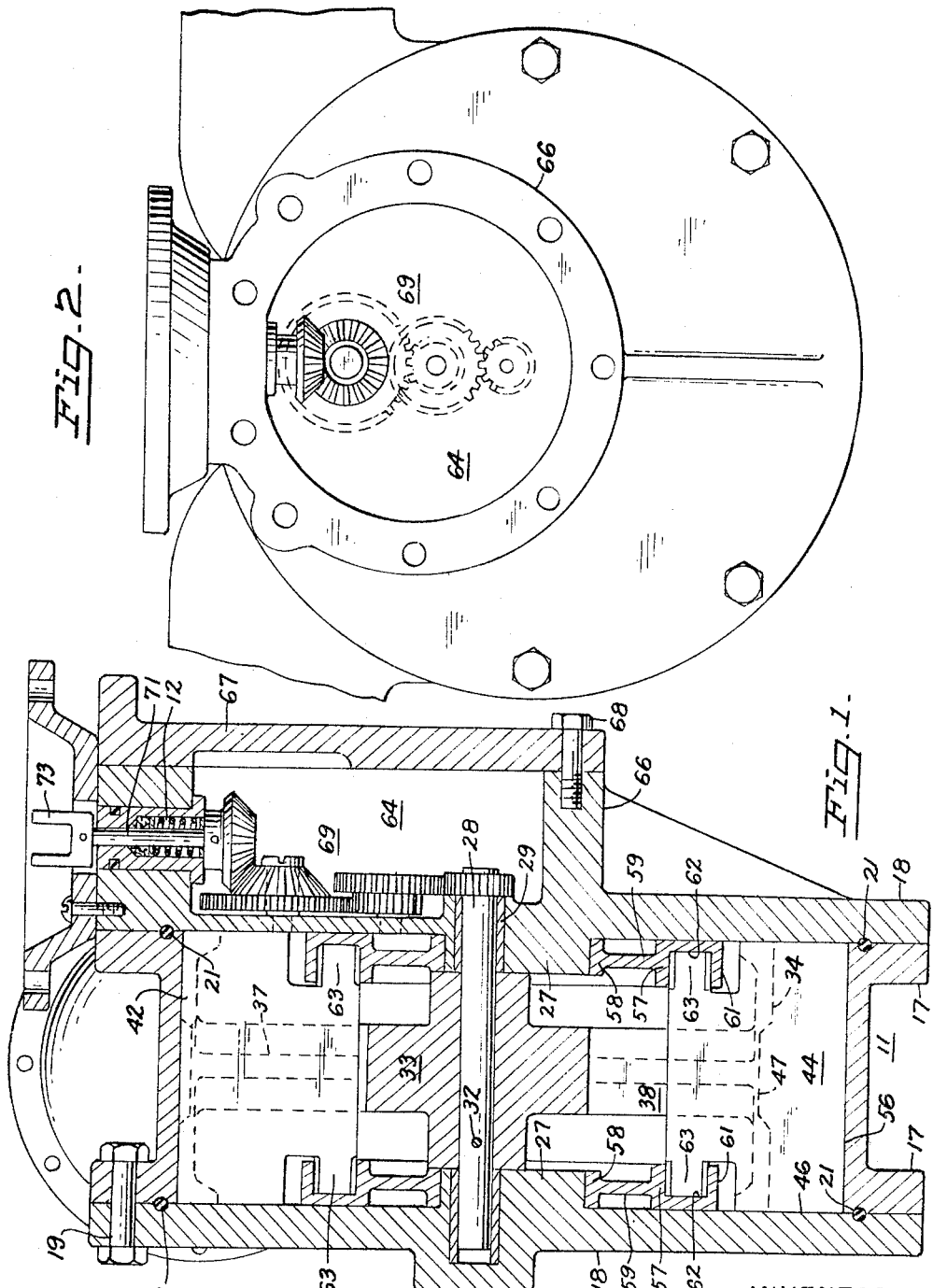

United States Patent Office 3,269,182
Patented August 30, 1966

3,269,182
POSITIVE DISPLACEMENT LIQUID METER
Albert J. Granberg, Oakland, Calif., assignor to Cal-Meter Co., Emeryville, Calif., a corporation of California
Filed May 10, 1965, Ser. No. 454,573
8 Claims. (Cl. 73—259)

The following specification is a continuation-in-part of my co-pending U.S. patent application Ser. No. 224,111 filed September 17, 1962, now U.S. Patent No. 3,212,331, and of my co-pending U.S. patent application Ser. No. 161,864 filed December 26, 1961, now abandoned.

This invention relates to liquid meters and more particularly to a rotary vane positive displacement type meter utilizing an eccentrically mounted rotor within a cylindrical metering chamber.

In the prior art, many meters, motors, and pumps have employed an eccentric rotary assembly with radially extending blades. The primary concern in rotary vane devices has been to have the blades seal the innner chamber of the housing on either side of the inlet or output port (sealing both sides of either likewise seals the other). One of these seals insures that the liquid passing through the meter, and around the rotary member, drives or is driven by the blades; the other seal prevents the liquid shortcutting directly to the outlet port. In pumps or motors, the seals are important only insofar as the efficiency of the device is concerned. For low speed operation the seals should be effective to prevent leakage, while for high speed operation, leakage is necessary to prevent unbalanced pressures from locking up the mechanism, or requiring excessive power input, or reducing output. This occurs due to the changing relationships of the chamber volume within the device.

To use a rotary vane device as a meter requires different considerations than for use as a pump or motor. The volume of flow through the meter must be accurately measured. Thus, at either high or low speed, the seals in the device must not leak or they must leak at a constant predeterminable rate over the entire speed range. To invent a meter which will achieve this result requires new and novel improvements in the art of liquid meters, pumps, and motors.

The present invention effects a solution to these problems and provides an accurate and efficient positive displacement meter having a meter housing defining a generally cylindrical internal wall with at least first and second truly cylindrical sections of the wall disposed at opposite sides of the chamber. Inlet and outlet ports are disposed on opposite sides of the first cylindrical wall section communicating through the housing with the cylindrical chamber. A generally cylindrical rotor cage is located in the chamber having a diameter less than that of the chamber, and is mounted on a central shaft supported eccentrically in the chamber with the cage substantially tangent to the first of the cylindrical wall sections at a point substanially midway beween the inlet and outlet ports. The cage has a plurality of equally spaced radial slots therein. A flat blade is slidably disposed in each of the radial slots and is adapted to slidably seal with the cylindrical wall of the chamber. At least one of the blades is in sealing relation with each of the cylindrical sections continuously. A cam ring is disposed between an end of the rotor cage and the proximate end of the chamber with its axis concentric to the axis of the chamber. The cam ring is rotatably mounted and has a circular cam guide in the form of an annular groove concentric with the axis of the cam ring. A like cam ring is similarly disposed between the opposite end of the rotor cage and the proximate end wall of the chamber. Means are disposed at each side of each of the blades placing them in engagement with the proximate cam ring and under control thereof to maintain each of the blades in slidable sealing relation with the cylindrical wall during rotation of the rotor cage. In this arrangement, the guide means that are concentric with the cylindrical chamber control the position of the sliding blades continuously to maintain a partition between the inlet and outlet and also to provide opposite the partition a compartment that moves within the chamber to advance a predetermined quantity of liquid from the inlet toward the outlet. Rotation of the rotor shaft is transmitted proportionally through one of the ends of the chamber, out of the meter housing, to any suitable register or read out means.

Heretofore, the prior art has not given consideration to the accurate measurement of units of liquid moving through a rotary vane meter. The prior art does not provide ways and means for predetermining and minimizing leakage across the meter.

Among the objects of my invention are:

(1) To provide a novel and improved positive displacement liquid meter for accurate measurement of liquid flow.

(2) To provide a novel and improved guide means for the guide vanes of an eccentric rotor assembly that is contained entirely within the metering chamber.

(3) To provide a novel and improved sealing means for a positive displacement meter of the type described having a constant predeterminable internal leakage rate that is proportional over the entire speed range.

(4) To provide a novel and improved cam ring for the blades of a meter of the type described that rotates entirely within the cylindrical chamber together with the rotor and block assembly and in the same direction with a minimum of friction.

(5) To provide a novel and improved positive displacement measuring means for a rotary vaned liquid meter.

These and other objects and advantages will become more apparent from the following specification of a preferred embodiment of my invention as described in relation to the attached drawings which form a part of this specification, wherein:

FIGURE 1 is a longitudinal vertical sectional view of a liquid meter embodying the invention;

FIGURE 2 is a frontal view of the meter of FIGURE 1 with the gear chamber cover removed;

Figure 3:
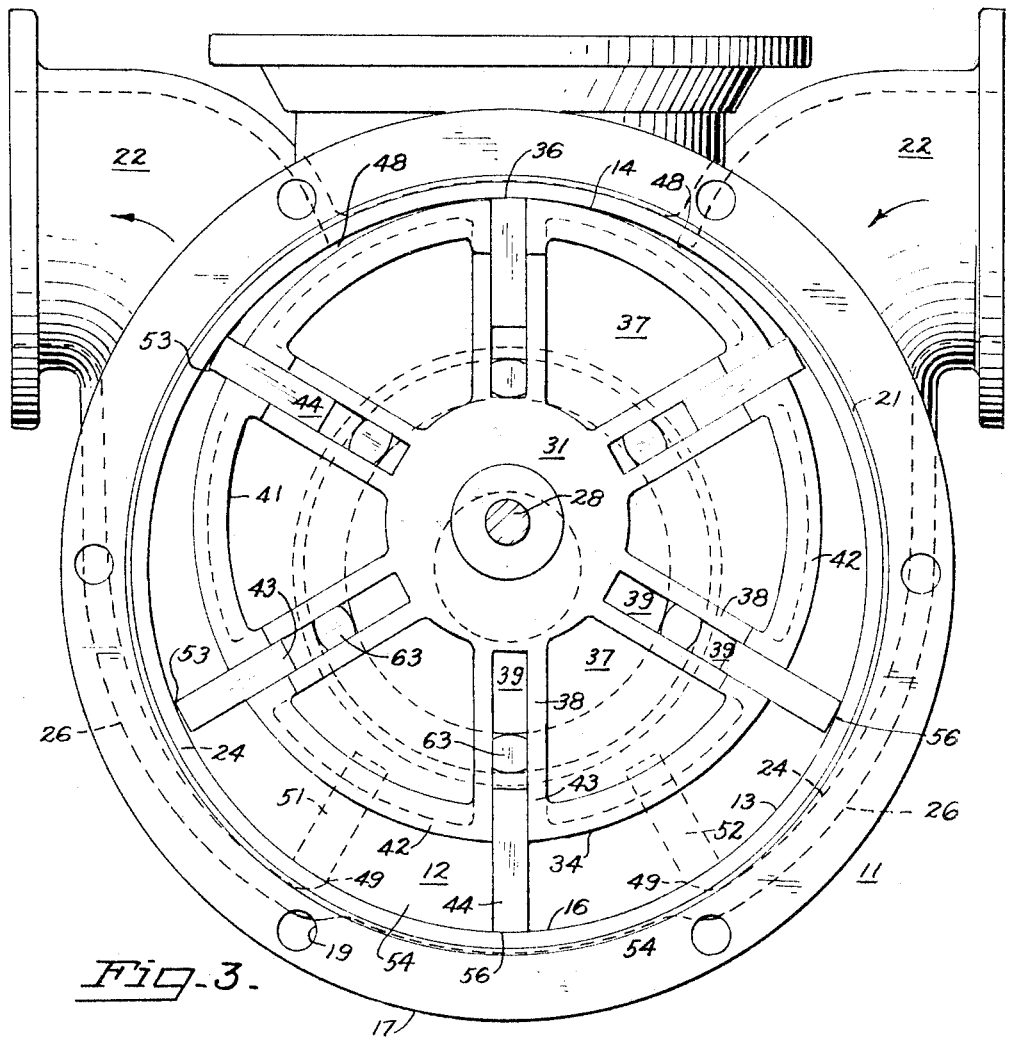
FIGURE 3 is an interior view of the meter of FIGURE 1 with the end cover and cam ring removed.

Referring to FIGURES 1 and 3 of the drawings, there shown is the housing 11 of the positive displacement liquid meter. The housing defines a generally cylindrical chamber 12 with an internal wall 13 having at least first 14 and second 16 truly cylindrical sections disposed at opposite sides of the chamber. The housing is provided with flanges 17 for the attachment of end cover plates 18 by such means as bolts 19 through matching bolt holes.

O ring seals 21 are provided disposed between the mating surfaces of the end plates and the housing to seal the covers to the meter body. The use of this type of seal at this location in the structure is critical as it permits a metal to metal seal between the encompassing portions of the meter. This type of seal permits accurate machining of the internal mating dimensions so that when the meter is assembled all of the internal parts fit with the proper clearances. The internal leak rate is thereby made predictable and consistent from meter to meter.

Referring now to FIGURE 3, it will be noted that the meter body 11 is provided with inlet 22 and outlet 23 ports communicating through the housing with the cylindrical chamber 12 and each intersect the inner bore of the body throughout a substantial portion of that bore by the cutaway or recessed portion 24 of the sidewalls 26. The ports are disposed on opposite sides of the first of the cylindrical wall sections 14.

As the meter body is symmetrical with respect to the inner bore, the direction of flow through the meter is immaterial. For the present purposes it will be assumed to be in the direction of the arrows so that the rotor assembly and associated parts will rotate in a clock-wise direction.

Projecting inwardly from the inner face of each of the end plates is a boss 27 machined truly concentric to the inner bore of the meter body. A rotor shaft 28 is eccentrically journalled 29 in each boss. A generally cylindrical rotor cage 31 is coaxially mounted on the rotor shaft and pinned 32 thereto through the hub 33. The rotor cage is proportioned to have its outer face 34 substantially tangent 36 to the first of the cylindrical wall sections of the chamber at a point midway between the inlet and outlet orifices.

The rotor is formed with a central hub 33, a web 37, spokes 38, outer face 34, slots 39, and skirts 41. The web 37 extends radially from the hub 33 in segments of a circle. The web is perpendicular to the axis of the hub and located symmetrically thereon. The outer face 34 of the rotor cage is formed by a peripheral segmental cap 42 on the web 37 which has a lateral width approximately equal to the width of the cylindrical chamber. Lateral dimensions are parallel a line perpendicular the end cover plates. The segmental cap 42 is perpendicular to the web. The segments of the outer face 34, or the segmental caps, have segmented skirts 41 secured to the lateral edges thereof which depend radially inward towards the hub parallel to the web and extend between the spokes 38. The spokes 38 in turn are formed perpendicularly abutting the web segments, in effect, forming laterally extending skirts to the web. The spokes extend in pairs from the hub and form slots 39 of uniform width between adjacent spokes. The outer radial ends of the spokes form a laterally extending skirt 43 which extends from the spokes 38 to the segmental skirt 41 on the lateral edge of the outer face 34. This skirt 43 depends generally toward the hub and is parallel with the axis thereof.

The surface area formed by the skirt provides a wide liquid film seal on all the contacting and moving and sliding surfaces in the rotor assembly which minimizes leakage. Each skirt which effects a seal is designed to provide approximately the same sealing effect as each of the other skirts so that there is a generally uniform sealing pressure throughout the meter.

A flat blade 44 is slidably disposed in each of the slots formed between the spokes. The outer ends of the blades slidably seal with the internal wall 13 of the bore of the meter housing while the sides of the blades slidably seal with the flat inner faces 46 of the end plates. The thickness of the blades is approximately equal to the thickness of the skirts in keeping with the principle of effecting uniform seals throughout the meter.

At least one of the blades is continuously sealing with the first of the cylindrical sections of the chamber. The circumferential distance between the edges of the inlet and outlet ports is so related to the number and the thickness of blades that the ends of successive blades are continuously sealing with the bore between those edges to form a sealed partition between the ports. Hence the continuous seal.

Figure 4:
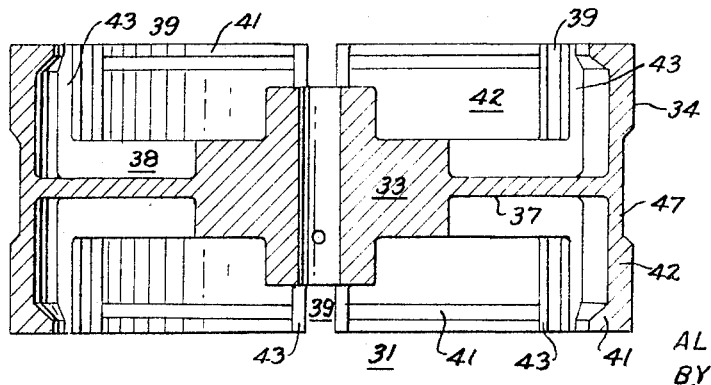
FIGURE 4 is a sectional view through the rotor shell of the meter of FIGURE 1.

The rotor cage effects a seal between the inlet and outlet ports by a novel means which produces a predeterminable rate of liquid recycle. An annular recess or channel 47 (FIGURE 4) is formed in the outer face of the rotor cage to permit a free flow of liquid at the point of tangency 36 between the rotor and the housing. The blades sweep a small amount of fluid around in the space 48 formed between the blade, the housing wall, and the outer face of the rotor cage, in the traverse across the cylindrical face from the outlet to the inlet port. This small amount is the same for each revolution of the meter and is therefore predeterminable. The constant rate of leakage, which is proportional to and dependent upon the rate of flow, can be compensated for in the gearing to the register. The channel 47 in the outer face of the rotor cage equalizes the pressure in the slot 48 as it is compressed by the blade moving toward the point of tangency by permitting it to pass into the expanding chamber beyond the point of tangency.

Similarly, the edges 49, at the opposite side of bore, sometimes called cut-off lines, are so spaced that a definite predetermined quantity of liquid is sealed between successive blades as they rotate and convey the liquid between the ports. The dotted lines 51, 52 indicate the instantaneous positions of successive blades when this occurs. The circumferential distance between the two closest peripheral edges 53 of adjacent blades should be just equal to the circumferential length of the second cylindrical wall section between the cut-off lines.

The use of this novel construction, wherein as one blade stops sealing with the bore between the cut-off lines, another blade establishes the seal and eliminates the problem of unbalanced pressures within the meter thereby reducing the problem of internal leakage. The unbalanced pressures occur due to the changing volume relationships within the meter housing. If more than one blade is sealing with the bore between the cut-off lines, the volume of the measuring slot 54, formed between adjacent blades and the outer face of the rotor cage and the bore of the housing, changes with rotation of the rotor assembly. For example; assume a blade is just establishing the seal with the cut-off line on the inlet side and a second blade is sealing with the bore of the housing on the inlet side of a point opposite the point of tangency of the rotor cage. As the rotor cage moves clockwise the volume of the measuring slot will increase until the blades are equidistant on each side of the point opposite the point of tangency, thereby pulling a vacuum on the liquid in the measuring space as the rotor cage moves clockwise until the maximum volume is reached. As the clockwise rotation continues, the measuring slot thereafter decreases in size until the foremost blade passes the cut-off line. Due to the relative incompressibility of liquids, this reduction in volume can cause a lockup unless undesirable leakage is allowed. Thus, in order to avoid these unbalanced pressures, a measuring slot was devised whereby the measured amount is locked off only instantaneously and the change of volume of the measuring slot is held to the absolute minimum. This is accomplished by making the length of the face of the second cylindrical section 16, opposite the point of tangency, just equal to the distance between the two closest peripheral edges of adjacent blades. Therefore, just as the rearward blade traps the measured quantity of liquid in the measuring slot, the forward blade completely passes the cut-off line releasing the measured quantity to the outlet port.

In order to maintain the outer ends 56 of the sliding blades in sealing relation with the bore throughout the rotation of the eccentrically journalled rotor cage, there is provided a cam ring 57 journalled for rotation about the bosses 27. It will be noted that each cam ring is rotatably maintained against the flat inner faces 46 of the end plates and thus may be readily installed, or replaced when worn, without any machining operation on the end plates. Each cam ring comprises a central hub 58, web 59 and rim 61, the latter being machined to form an annular groove 62.

Cam followers 63 project laterally from the inner radial ends of the blades 44 for engaging the annular grooves 62 of the proximate cam rings 57.

This construction accomplishes a principal objective of the invention herein, viz., to provide simple and effective guide means for the flat blades. The cams are contained entirely between the flat end plates and are freely rotatable with the rotor assembly.

In this embodiment of the invention, the shaft 28 of the rotor assembly projects through the end plate into a compartment 64 formed on the end plate by a circular wall 66. The compartment can be sealed by a cover plate 67 secured by screws 68.

A gear train 69 transmits the rotation of the rotor shaft 28 to a register shaft 71, desirably sealed by a packing gland 72, where it passes through the circular wall 72 and terminates in a register clutch member 73. A register or counting device (not shown) may be attached to a base member secured to the circular wall as by screws.

In conclusion, it will be appreciated that a novel improvement invention, in the field of positive displacement liquid meters, has been attained by the novel relationship between the cam rings, end plates, and rotor assembly as just described and illustrated. Although many alterations can be made within the invention, without departing from the spirit and scope thereof, this invention is not to be limited except as defined in the appended claims.

I claim:

1. A positive displacement liquid meter comprising
a meter housing defining a generally cylindrical chamber having a generally cylindrical internal wall with at least first and second truly cylindrical sections disposed at opposite sides of said chamber,
end cover plates mating and sealing with said housing at the ends of said cylindrical chamber,
inlet and outlet ports disposed on opposite sides of the first of said wall sections communicating through said housing with said cylindrical chamber,
a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said cage having a plurality of equally spaced radial slots therein,
a flat blade slidably disposed in each of said radial slots and adapted to slidably seal with the generally cylindrical wall of said chamber, at least one of said blades sealing with each of said cylindrical sections of said housing wall continuously,
means for permitting the escape of liquid from the decreasing chamber formed by the rotor cage and that portion of the first cylindrical internal wall section between the point of tangency of said rotor with said wall section and said outlet port and a blade moving from said outlet port toward said point of tangency during operation of the meter,
a cam ring disposed between an end of said rotor cage and the adjacent end cover plate with its axis concentric with the axis of said chamber, said cam ring being rotatably mounted and having a circular cam guide in the form of an annular groove concentric with the axis of said cam ring,
a like cam ring similarly disposed between the opposite end of said rotor cage and the adjacent end cover plate,
cam followers projecting laterally from the inner radial ends of said blades engaging the annular grooves of the proximate cam rings, and
register means connected with said rotor cage for recording the rotation thereof.

2. A positive displacement liquid meter comprising
a meter housing defining a generally cylindrical chamber having a generally cylindrical internal wall with at least first and second truly cylindrical sections disposed at opposite sides of said chamber,
inlet and outlet ports disposed on opposite sides of the first of said wall sections communicating through said housing with said cylindrical chamber,
a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said rotor cage having a central hub coaxially mounted on and secured to said central shaft, a radial web extending in segments from said hub perpendicular to the axis thereof, a peripheral segmental cap forming the cylindrical portion of the outer face of the rotor cage approximately the lateral width of said cylindrical chamber secured to and positioned perpendicular to said web, skirts secured to the lateral edges of said segmental cap depending radially inward parallel to said web, spokes perpendicularly abutting said web segments extending in pairs from said hub forming slots between adjacent spokes, the outer radial ends of said spokes forming a radially inward depending skirt to said segmental cap parallel the axis of said hub,
a flat blade slidably disposed in each of said radial slots and adapted to slidably seal with the generally cylindrical wall of said chamber, at least one of said blades sealing with each of said cylindrical sections of said housing wall continuously,
means for permitting the escape of liquid from the decreasing chamber formed by the rotor cage and that portion of the first cylindrical internal wall section between the point of tangency of said rotor with said wall section and said outlet port and the blade moving from said said outlet port toward said point of tangency during operation of the meter,
a cam ring disposed between an end of said rotor cage and the proximate end of said chamber with its axis concentric with the axis of said chamber, said cam ring being rotatably mounted and having a circular cam guide in the form of an annular groove concentric with the axis of said cam ring,
a like cam ring similarly disposed between the opposite end of said rotor cage and the proximate end wall of said chamber,
means at each side of each of said blades placing them in engagement with the proximate cam ring and under control thereof to maintain each of said blades in slidable contact with said cylindrical wall during rotation of said rotor cage, and
register means connected with said rotor cage for recording the rotation thereof.

3. A positive displacement liquid meter comprising
a meter housing defining a generally cylindrical chamber having a generally cylindrical internal wall with at least first and second truly cylindrical sections disposed at opposite sides of said chamber,
inlet and outlet ports disposed on opposite sides of the first of said wall sections communicating through said housing with said cylindrical chamber,
a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said cage having a plurality of equally spaced radial slots therein,
a channel formed in the peripheral face of said rotor cage for permitting the free flow of liquid there along at the point of tangency of said rotor and said housing,
a flat blade slidably disposed in each of said radial slots and adapted to slidably seal with the generally cylindrical wall of said chamber, at least one of said blades sealing with each of said cylindrical sections of said housing wall continuously, a cam ring disposed between an end of said rotor cage and the proximate end of said chamber with its axis concentric with the axis of said chamber, said cam ring being rotatably mounted and having a circular cam guide in the form of an annular groove concentric with the axis of said cam ring, a like cam ring similarly disposed between the opposite end of said rotor cage and the proximate end wall of said chamber, means at each side of each of said blades placing them in engagement with the proximate cam ring and under control thereof to maintain each of said blades in slidable contact with said cylindrical wall during rotation of said rotor cage, and register means connected with said rotor cage for recording the rotation thereof.

4. A positive displacement liquid meter comprising a meter housing defining a generally cylindrical chamber having a generally cylindrical internal wall with at least first and second truly cylindrical sections disposed at opposite sides of said chamber, inlet and outlet ports disposed on opposite sides of the first of said wall sections communicating through said housing with said cylindrical chamber, a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said cage having a plurality of equally spaced radial slots therein, a flat blade slidably disposed in each of said radial slots and adapted to slidably seal with the generally cylindrical wall of said chamber, at least one of said blades continuously sealing with the first of said cylindrical sections of said chamber, the circumferential distance between the two closest peripheral edges of adjacent blades approximately equal to the circumferential length of said second cylindrical wall sections, means for permitting the escape of liquid from the decreasing chamber formed by the rotor cage and that portion of the first cylindrical internal wall section between the point of tangency of said rotor with said wall section and said outlet port and the blade moving from said outlet port toward said point of tangency during operation of the meter, a cam ring disposed between an end of said rotor cage and the proximate end of said chamber with its axis concentric with the axis of said chamber, said cam ring being rotatably mounted and having a circular cam guide in the form of an annular groove concentric with the axis of said cam ring, a like cam ring similarly disposed between the opposite end of said rotor cage and the proximate end wall of said chamber, means at each side of each of said blades placing them in engagement with the proximate cam ring and under control thereof to maintain each of said blades in slidable contact with said cylindrical wall during rotation of said rotor cage, and register means connected with said rotor cage for recording the rotation thereof.

5. A positive displacement liquid meter comprising a meter housing defining a generally cylindrical chamber having a generally cylindrical internal wall with at least first and second truly cylindrical sections disposed at opposite sides of said chamber, end cover plates formed for mating with said housing at the ends of said cylindrical chamber, O ring seals disposed between the mating surface of said end plates and said housing, means for securing said end plates to said housing and compressing said O rings, inlet and outlet ports disposed on opposite sides of the first of said wall sections communicating through said housing with said cylindrical chamber, a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said rotor cage having a central hub coaxially mounted on and secured to said central shaft, a radial web extending in segments from said hub perpendicular to the axis thereof, a peripheral segmental cap forming the cylindrical portion of the outer face of the rotor cage approximately the lateral width of said cylindrical chamber secured to and positioned perpendicular to said web, skirts secured to the lateral edges of said segmental cap depending radially inward parallel to said web, spokes perpendicularly abutting said web segments extending in pairs from said hub forming slots between adjacent spokes, the outer radial ends of said spokes forming a radially inward depending skirt to said segmental cap parallel the axis of said hub, a channel formed in the peripheral face of said rotor cage for permitting the free flow of liquid there along at the point of tangency of said rotor and said housing, a flat blade slidably disposed in each of said radial slots and adapted to slidably seal with the generally cylindrical wall of said chamber, at least one of said blades sealing with each of said cylindrical sections of said housing wall continuously, a cam ring disposed between an end of said rotor cage and the adjacent end cover plate with its axis concentric with the axis of said chamber, said cam ring being rotatably mounted and having a circular cam guide in the form of an annular groove concentric with the axis of said cam ring, a like cam ring similarly disposed between the opposite end of said rotor cage and the adjacent end cover plate, cam followers projecting laterally from the inner radial ends of said blades engaging the annular grooves of the proximate cam rings, and register means connected with said rotor cage for recording the rotation thereof.

6. A positive displacement liquid meter comprising a meter housing defining a generally cylindrical chamber having a generally cylindrical internal wall with at least first and second truly cylindrical sections disposed at opposite sides of said chamber, end cover plates formed for mating with said housing at the ends of said cylindrical chamber, O ring seals disposed between the mating surfaces of said end plates and said housing, means for securing said end plates to said housing and compressing said O rings, inlet and outlet ports disposed on opposite sides of the first of said wall sections communicating through said housing with said cylindrical chamber, a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said rotor cage having a central hub coaxially mounted on and secured to said central shaft, a radial web extending in segments from said hub perpendicular to the axis thereof, a peripheral segmental cap forming the cylindrical portion of the outer face of the rotor cage approximately the lateral width of said cylindrical chamber secured to and positioned perpendicular to said web, skirts secured to the lateral edges of said segmental cap depending radially inward parallel to said web, spokes perpendicularly abutting said web segments extending in pairs from said hub forming slots between adjacent spokes, the outer radial ends of said spokes forming a radially inward depending skirt to said segmental cap parallel the axis of said hub, a flat blade slidably disposed in each of said radial slots and adapted to slidably seal with the generally cylindrical wall of said chamber, at least one of said blades continuously sealing with the first of said cylindrical sections of said chamber, the circumferential distance between the two closest peripheral edges of adjacent blades approximately equal to the circumferential length of said second cylindrical wall sections, means for permitting the escape of liquid from the decreasing chamber formed by the rotor cage and that portion of the first cylindrical internal wall section between the point of tangency of said rotor with said wall section and said outlet port and the blade moving from said outlet port toward said point of tangency during operation of the meter, a cam ring disposed between and end of said rotor cage and the adjacent end cover plate with its axis concentric with the axis of said chamber, said cam ring being rotatably mounted and having a circular cam guide in the form of an annular groove concentric with the axis of said cam ring, a like cam ring similarly disposed between the opposite end of said rotor cage and the adjacent end cover plate, cam followers projecting laterally from the inner radial ends of said blades engaging the annular grooves of the proximate cam rings, and register means connected with said rotor cage for recording the rotation thereof.

7. A positive displacement liquid meter comprising
a meter housing defining a generally cylindrical chamber having a generally cylindrical internal wall with at least first and second truly cylindrical sections disposed at opposite sides of said chamber, end cover plates formed for mating with said housing at the ends of said cylindrical chamber, O ring seals disposed between the mating surfaces of said end plates and said housing, means for securing said end plates to said housing and compressing said O rings, inlet and outlet ports disposed on opposite sides of the first of said wall sections communicating through said housing with said cylindrical chamber, a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said cage having a plurality of equally spaced radial slots therein, a channel formed in the peripheral face of said rotor cage for permitting the free flow of liquid there along at the point of tangency of said rotor and said housing, a flat blade slidably disposed in each of said radial slots and adapted to slidably seal with the generally cylindrical wall of said chamber, at least one of said blades continuously sealing with the first of said cylindrical sections of said chamber, the circumferential distance between the two closest peripheral edges of adjacent blades approximately equal to the circumferential length of said second cylindrical wall sections, a cam ring disposed between an end of said rotor cage and the adjacent end cover plate with its axis concentric with the axis of said chamber, said cam ring being rotatably mounted and having a circular cam guide in the form of an annular groove concentric with the axis of said cam ring, a like cam ring similarly disposed between the opposite end of said rotor cage and the adjacent end cover plate, cam followers projecting laterally from the inner radial ends of said blades engaging the annular grooves of the proximate cam rings, and register means connected with said rotor cage for recording the rotation thereof.

8. A positive displacement liquid meter comprising
a meter housing defining a generally cylindrical chamber having a generally cylindrical internal wall with at least first and second truly cylindrical sections disposed at opposite sides of said chamber, end cover plates formed for mating with said housing at the ends of said cylindrical chamber, O ring seals disposed between the mating surfaces of said end plates and said housing, means for securing said end plates to said housing and compressing said O rings, inlet and outlet ports disposed on opposite sides of the first of said wall sections communicating through said housing with said cylindrical chamber, a generally cylindrical rotor cage in said chamber having a diameter less than that of said chamber and mounted on a central shaft supported eccentrically in said chamber with the cage substantially tangent to the first of said cylindrical wall sections of said chamber at a point substantially midway between said inlet and outlet ports, said rotor cage having a central hub coaxially mounted on and secured to said central shaft, a radial web extending in segments from said hub perpendicular to the axis thereof, a peripheral segmental cap forming the cylindrical portion of the outer face of the rotor cage approximately the lateral width of said cylindrical chamber secured to and positioned perpendicular to said web, skirts secured to the lateral edges of said segmental cap depending radially inward parallel to said web, spokes perpendicularly abutting said web segments extending in pairs from said hub forming slots between adjacent spokes, the outer radial ends of said spokes forming a radially inward depending skirt to said segmental cap parallel the axis of said hub, a channel formed in the peripheral face of said rotor cage for permitting the free flow of liquid therealong at the point of tangency of said rotor and said housing, a flat blade slidably disposed in each of said radial slots and adapted to slidably seal with the generally cylindrical wall of said chamber, at least one of said blades continuously sealing with the first of said cylindrical sections of said chamber, the circumferential distance between the two closest peripheral edges of adjacent blades approximately equal to the circumferential length of said second cylindrical wall sections, a cam ring disposed between an end of said rotor cage and the adjacent end cover plate with its axis concentric with the axis of said chamber, said cam ring being rotatably mounted and having a circular cam guide in the form of an annular groove concentric with the axis of said cam ring, a like cam ring similarly disposed between the opposite end of said rotor cage and the adjacent end cover plate, cam followers projecting laterally from the inner radial ends of said blades engaging the annular grooves of the proximate cam rings, and register means connected with said rotor cage for recording the rotation thereof.

(References on following page)

References Cited by the Examiner

UNITED STATES PATENTS

| | | | |
|---|---|---|---|
| 141,000 | 7/1873 | Gillespie | 103—136 |
| 489,124 | 1/1893 | Fuller | 73—259 X |
| 1,901,348 | 3/1933 | Kapuczin | 73—259 X |
| 2,207,182 | 7/1940 | Smith | 73—254 X |
| 2,627,848 | 2/1953 | Smith. | |
| 3,053,088 | 9/1962 | Granberg | 73—259 |

FOREIGN PATENTS

| | | |
|---|---|---|
| 406,906 | 3/1934 | Great Britain. |
| 547,986 | 9/1942 | Great Britain. |

RICHARD C. QUEISSER, *Primary Examiner.*

E. D. GILHOOLY, *Assistant Examiner.*